United States Patent
Mathuria et al.

(10) Patent No.: US 12,152,506 B2
(45) Date of Patent: Nov. 26, 2024

(54) BLEED PASSAGE ARRANGEMENT FOR A GAS TURBINE ENGINE SHROUD

(71) Applicant: Raytheon Technologies Corporation, Farmington, CT (US)

(72) Inventors: Parag H. Mathuria, Palm Beach Gardens, FL (US); Lajos H. Horvath, Jupiter, FL (US); Joshua R. Seyler, Stuart, FL (US); Malvin B. Cedeno-Jimenez, West Palm Beach, FL (US); James Masloski, Lake Worth, FL (US); Jason P. Meert, Port St Lucie, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/971,270

(22) Filed: Oct. 21, 2022

(65) Prior Publication Data

US 2024/0133307 A1 Apr. 25, 2024
US 2024/0229663 A9 Jul. 11, 2024

(51) Int. Cl.
*F01D 9/06* (2006.01)
*F01D 11/08* (2006.01)
*F04D 29/42* (2006.01)

(52) U.S. Cl.
CPC .............. *F01D 9/065* (2013.01); *F01D 11/08* (2013.01); *F04D 29/4206* (2013.01); *F05D 2240/11* (2013.01); *F05D 2260/201* (2013.01)

(58) Field of Classification Search
CPC .... F04D 29/4206; F04D 29/40; F04D 29/682; F04D 27/009; F04D 27/0207; F02C 9/18;
(Continued)

(56) References Cited

U.S. PATENT DOCUMENTS 6,109,868 A * 8/2000 Bulman ................ F04D 27/023
415/185
8,105,012 B2 1/2012 Anema
(Continued)

FOREIGN PATENT DOCUMENTS

JP 5579104 B2 8/2014

OTHER PUBLICATIONS

EP search report for EP23205349.6 dated Jun. 3, 2024.

*Primary Examiner* — Justin D Seabe
*Assistant Examiner* — Michael K. Reitz
(74) *Attorney, Agent, or Firm* — Getz Balich LLC

(57) ABSTRACT

An apparatus is provided for a gas turbine engine. This engine apparatus includes a shroud, and the shroud includes a wall and a bleed passage. The wall includes an interior surface and an exterior surface. The wall extends circumferentially about an axis. The wall extends depthwise between the interior surface and the exterior surface. The interior surface forms a peripheral boundary of a flowpath that extends along the shroud. The bleed passage includes an inlet orifice and an outlet orifice. The bleed passage extends through the shroud between the inlet orifice and the outlet orifice. The inlet orifice is disposed in the interior surface and fluidly couples the flowpath to the bleed passage. At least a downstream section of the bleed passage circumferentially tapers as the downstream section of the bleed passage extends within the wall towards the outlet orifice.

13 Claims, 8 Drawing Sheets

(58) Field of Classification Search
CPC ........... F05D 2270/10; F05D 2270/101; F05D 2270/102; F05D 2270/1024; F01D 9/065; F01D 11/08

See application file for complete search history.

(56) References Cited

U.S. PATENT DOCUMENTS

| | | |
|---|---|---|
| 9,394,792 B2 | 7/2016 | Leblanc |
| 9,726,084 B2 | 8/2017 | Duong |
| 9,810,157 B2 | 11/2017 | Nichols |
| 2002/0106274 A1 | 8/2002 | Sumser |
| 2018/0230805 A1* | 8/2018 | Miller ........................ F01D 5/03 |
| 2018/0355877 A1* | 12/2018 | Donnelly .................. F02C 9/18 |
| 2019/0226488 A1 | 7/2019 | Tawfik |

* cited by examiner

BLEED PASSAGE ARRANGEMENT FOR A GAS TURBINE ENGINE SHROUD

BACKGROUND OF THE DISCLOSURE

1. Technical Field

This disclosure relates generally to a gas turbine engine and, more particularly, to a bleed passage for the gas turbine engine.

2. Background Information

A gas turbine engine may include a bleed passage for bleeding air from a flowpath. Various types and configurations of bleed passages are known in the art. While these known bleed passages have various advantages, there is still room in the art for improvement. There is a need in the art, for example, for a bleed passage with enhanced flow efficiency therethrough.

SUMMARY OF THE DISCLOSURE

According to an aspect of the present disclosure, an apparatus is provided for a gas turbine engine. This engine apparatus includes a shroud, and the shroud includes a wall and a bleed passage. The wall includes an interior surface and an exterior surface. The wall extends circumferentially about an axis. The wall extends depthwise between the interior surface and the exterior surface. The interior surface forms a peripheral boundary of a flowpath that extends along the shroud. The bleed passage includes an inlet orifice and an outlet orifice. The bleed passage extends through the shroud between the inlet orifice and the outlet orifice. The inlet orifice is disposed in the interior surface and fluidly couples the flowpath to the bleed passage. At least a downstream section of the bleed passage circumferentially tapers as the downstream section of the bleed passage extends within the wall towards the outlet orifice.

According to another aspect of the present disclosure, another apparatus is provided for a gas turbine engine. This engine apparatus includes a shroud, and the shroud includes a wall and a bleed passage. The wall includes an interior surface and an exterior surface. The wall extends circumferentially about an axis. The wall extends radially between the interior surface and the exterior surface. The interior surface forms an outer peripheral boundary of a flowpath that extends within the shroud. The bleed passage includes an inlet orifice, a plurality of outlet orifices, an inlet leg and a plurality of outlet legs fluidly coupled with and branching off from the inlet leg. The inlet orifice is disposed in the interior surface and fluidly couples the flowpath to the bleed passage. The inlet leg extends radially within the shroud to the inlet orifice. Each of the outlet legs extends radially within the shroud to a respective one of the outlet orifices.

According to still another aspect of the present disclosure, another apparatus is provided for a gas turbine engine. This engine apparatus includes a shroud, and the shroud includes a wall and a bleed passage. The wall includes an interior surface and an exterior surface. The wall extends circumferentially about an axis. The wall extends radially between the interior surface and the exterior surface. The interior surface forms an outer peripheral boundary of a flowpath that extends within the shroud. The bleed passage includes an inlet orifice, a first outlet orifice, a second outlet orifice, a first passage leg and a second passage leg. The inlet orifice is disposed in the interior surface and fluidly couples the flowpath to the bleed passage. The first passage leg extends through the shroud along a first leg centerline from the inlet orifice to the first outlet orifice. The second passage leg extends through the shroud along a second leg centerline from the inlet orifice to the second outlet orifice. The second leg centerline is angularly offset from the first leg centerline at the inlet orifice by an included angle.

The inlet orifice and the inlet leg may be annular.

The downstream section of the bleed passage may circumferentially taper as the downstream section of the bleed passage extends to the outlet orifice.

The bleed passage may also include a second outlet orifice. A second downstream section of the bleed passage may circumferentially taper as the second downstream section of the bleed passage extends within the wall towards the second outlet orifice.

The second outlet orifice may be circumferentially offset from the outlet orifice about the axis. In addition or alternatively, the second outlet orifice may be axially aligned with the outlet orifice along the axis.

An upstream section of the bleed passage may circumferentially taper as the upstream section of the bleed passage extends within the wall towards the inlet orifice.

The bleed passage may also include a second inlet orifice. A second upstream section of the bleed passage may circumferentially taper as the second upstream section of the bleed passage extends within the wall towards the second inlet orifice.

The inlet orifice may be annular and extend circumferentially about the axis in the interior surface.

The inlet orifice may be non-annular.

The outlet orifice may be non-annular.

The outlet orifice may be one of a plurality of outlet orifices. The bleed passage may also include an inlet leg and a plurality of outlet legs fluidly coupled with and branching off from the inlet leg. The inlet leg may form the inlet orifice. Each of the outlet legs may form a respective one of the outlet orifices.

A first of the outlet legs may circumferentially taper within the wall as the first of the outlet legs extends towards a first of the outlet orifices.

The bleed passage may also include: a second inlet orifice; a first passage leg extending through the shroud from the inlet orifice to the outlet orifice; and a second passage leg extending through the shroud from the second inlet orifice to the outlet orifice.

A centerline of the first passage leg may be angularly offset from a centerline of the second passage leg by an included angle.

The bleed passage may also include: a second outlet orifice; a first passage leg extending through the shroud from the inlet orifice to the outlet orifice; and a second passage leg extending through the shroud from the inlet orifice to the second outlet orifice.

A centerline of the first passage leg may be angularly offset from a centerline of the second passage leg by an included angle.

The outlet orifice may be disposed in the exterior surface. In addition or alternatively, the exterior surface may form a peripheral boundary of a plenum along the shroud. The outlet orifice may fluidly couple the bleed passage to the plenum.

The engine apparatus may also include a compressor rotor housed within the shroud. The compressor rotor may include a plurality of blades arranged circumferentially about the axis and disposed within the flowpath.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
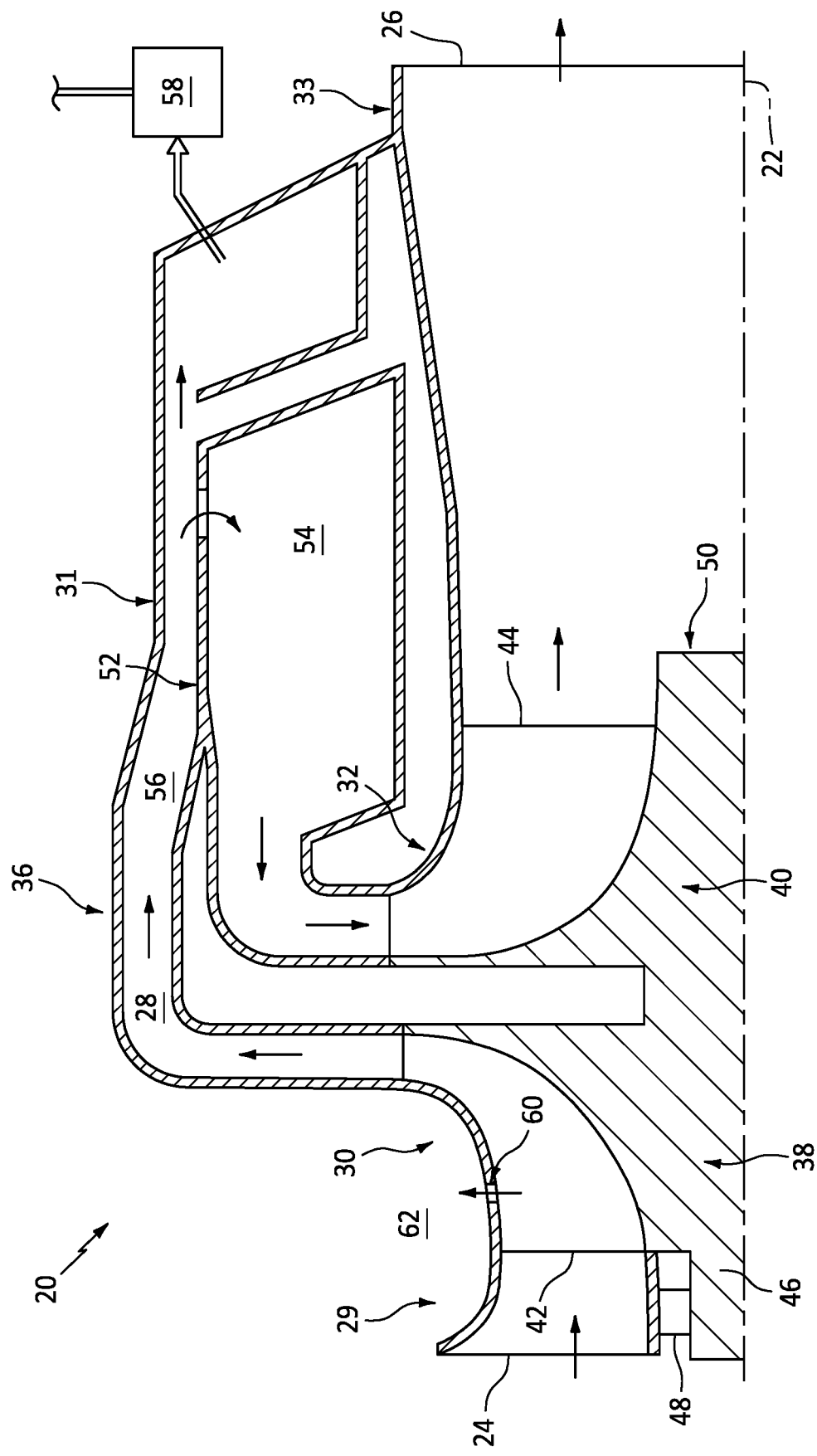
FIG. 1 is a partial side sectional illustration of a gas turbine engine.

FIG. 1 is a partial side sectional illustration of a gas turbine engine 20. The gas turbine engine 20 of FIG. 1 is configured as a single spool, radial-flow gas turbine engine. This gas turbine engine 20 may be included in an auxiliary power unit (APU) for an aircraft. Alternatively, the gas turbine engine 20 may be included in a propulsion system for the aircraft. Examples of the aircraft include, but are not limited to, an airplane, a drone (e.g., an unmanned aerial vehicle (UAV)), a helicopter or any other manned or unmanned aerial vehicle. The present disclosure, however, is not limited to such an exemplary single spool, radial-flow gas turbine engine nor to aircraft applications. For example, the gas turbine engine 20 may alternatively be configured as an industrial gas turbine engine within a land based power generation system.

The gas turbine engine 20 of FIG. 1 extends axially along an axial centerline 22 from a forward, upstream airflow inlet 24 into the gas turbine engine 20 to an aft, downstream combustion products exhaust 26 from the gas turbine engine 20. This axial centerline 22 may also be a centerline axis and/or a rotational axis for various components within the gas turbine engine 20.

The gas turbine engine 20 includes a core flowpath 28, an inlet section 29, a (e.g., radial flow) compressor section 30, a (e.g., reverse flow) combustor section 31, a (e.g., radial flow) turbine section 32 and an exhaust section 33. The gas turbine engine 20 also includes a stationary structure 36 housing and/or at least partially forming one or more or all of the engine sections 29-33.

The core flowpath 28 may extend within the gas turbine engine 20 from the airflow inlet 24 to the combustion products exhaust 26. The core flowpath 28 of FIG. 1, in particular, extends sequentially through the inlet section 29, the compressor section 30, the combustor section 31, the turbine section 32 and the exhaust section 33.

The compressor section 30 includes a bladed compressor rotor 38; e.g., a compressor impeller. The turbine section 32 includes a bladed turbine rotor 40; e.g., a turbine impeller. Each of these engine rotors 38, 40 includes a plurality of rotor blades 42, 44 (e.g., vanes) arranged circumferentially around and connected to at least one respective rotor hub. The rotor blades 42, 44, for example, may be formed integral with or mechanically fastened, welded, brazed, adhered and/or otherwise attached to the respective rotor hub.

The compressor rotor 38 may be configured as a radial flow compressor rotor, and the compressor section 30 may be configured as a radial flow compressor section. The turbine rotor 40 may be configured as a radial flow turbine rotor, and the turbine section 32 may be configured as a radial flow turbine section. The compressor rotor 38 of FIG. 1 is connected to the turbine rotor 40 and an engine shaft 46. This engine shaft 46 is rotatably supported by the stationary structure 36 through a plurality of bearings 48 (one schematically shown in FIG. 1); e.g., rolling element bearings, journal bearings, etc. At least the compressor rotor 38, the turbine rotor 40 and the engine shaft 46 may form an engine rotating structure 50 within the gas turbine engine 20.

The combustor section 31 includes an annular combustor 52 with an annular combustion chamber 54. The combustor 52 of FIG. 1 is configured as a reverse flow combustor. Inlets ports/flow tubes into the combustion chamber 54, for example, may be arranged at (e.g., on, adjacent or proximate) and/or towards an aft bulkhead wall of the combustor 52. An outlet from the combustor 52 may be arranged axially aft of an inlet to the turbine section 32. The combustor 52 may also be arranged radially outboard of and/or axially overlap at least a (e.g., aft) portion of the turbine section 32. With this arrangement, the core flowpath 28 of FIG. 1 reverses direction (e.g., from a forward-to-aft direction to an aft-to-forward direction) a first time as the core flowpath 28 extends from a diffuser plenum 56 surrounding the combustor 52 into the combustion chamber 54. The core flowpath 28 of FIG. 1 then reverses direction (e.g., from the aft-to-forward direction to the forward-to-aft direction) a second time as the core flowpath 28 extends from the combustion chamber 54 into the turbine section 32.

During operation, air enters the gas turbine engine 20 through the inlet section 29 and its airflow inlet 24. The inlet section 29 directs the air from the airflow inlet 24 into the core flowpath 28 and the compressor section 30. The air entering the core flowpath 28 may be referred to as core air. This core air is compressed by the compressor rotor 38. The compressed core air is directed through a diffuser and its plenum 56 into the combustion chamber 54. Fuel is injected and mixed with the compressed core air to provide a fuel-air mixture. This fuel-air mixture is ignited within the combustion chamber 54, and combustion products thereof flow through the turbine section 32 and cause the turbine rotor 40 to rotate. The rotation of the turbine rotor 40 drives rotation of the compressor rotor 38 and, thus, compression of the air received from the airflow inlet 24. The exhaust section 33 receives the combustion products from the turbine section 32. The exhaust section 33 directs these combustion products out of the gas turbine engine 20 through the combustion products exhaust 26.

During certain modes of operation, the compressed core air may be bled from the core flowpath 28 and provided to one or more other devices; e.g., a starter motor, an actuator, an aircraft environmental system, etc. The compressed core air, for example, may be bled from the diffuser plenum 56 and directed through at least one valve 58 to the one or more other devices. During other modes of operation, however, the valve 58 may close. To alleviate backpressure within the gas turbine engine 20 associated with closing of the valve 58, the gas turbine engine 20 of FIG. 1 is configured with an upstream bleed passage 60; e.g., a compressor vent. This bleed passage 60 is operable to vent air from the core flowpath 28 (e.g., air being compressed by the compressor rotor 38) into an exterior plenum 62 outside of the gas turbine engine 20. Such venting (while the valve 58 is closed) may reduce or prevent occurrence of surge and/or various other undesirable modes within the gas turbine engine 20 and, for example, its compressor section 30.

Figure 2:
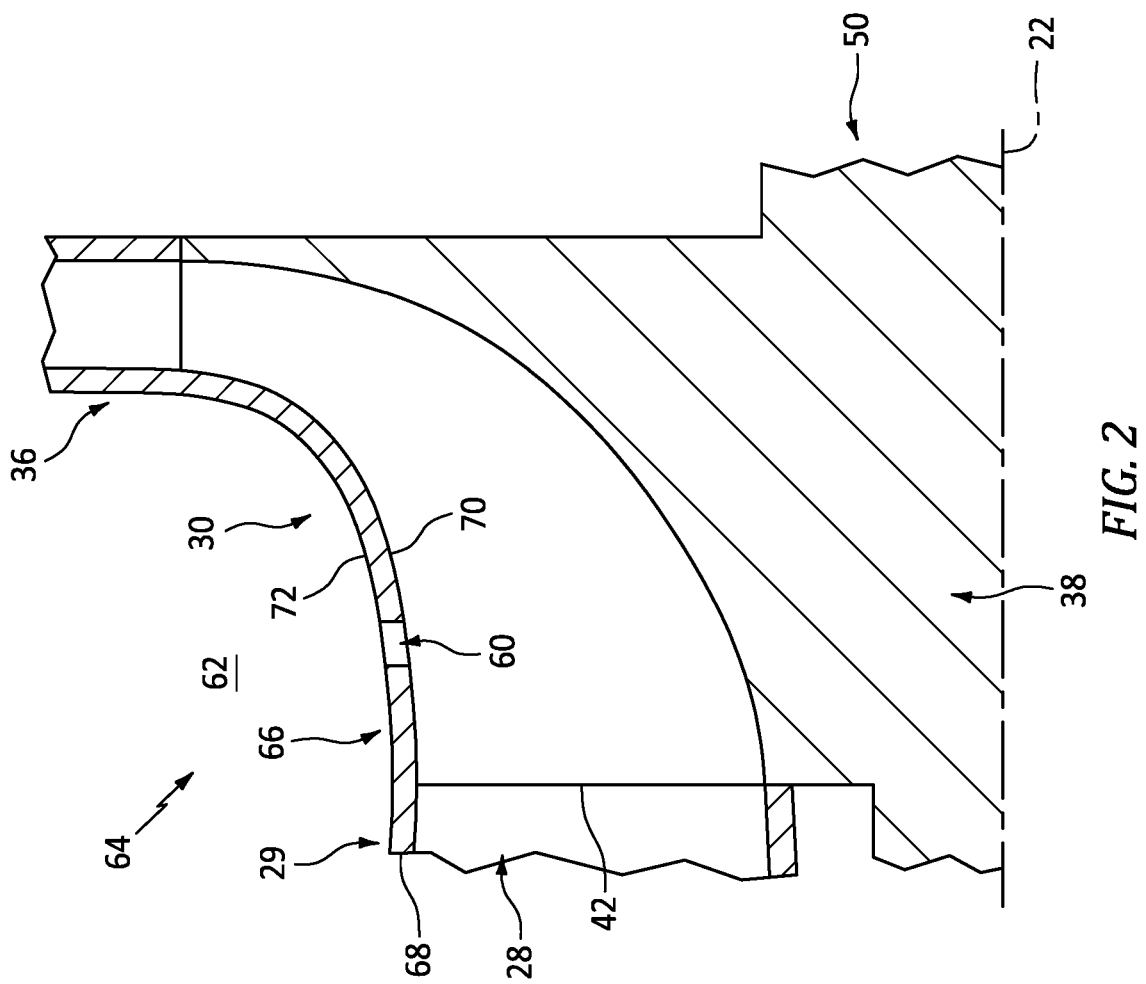
FIG. 2 is a partial side sectional illustration of an engine apparatus with a shroud surrounding a compressor rotor.

FIG. 2 is a partial sectional illustration of an apparatus 64 for the gas turbine engine 20 configured with the bleed passage 60. This engine apparatus 64 includes at least a portion of the stationary structure 36 and, in particular, a shroud 66 (e.g., a tubular flowpath wall) included in the stationary structure 36 along the compressor section 30. The engine apparatus 64 of FIG. 2 may also include at least a portion of the engine rotating structure 50 and, in particular, the compressor rotor 38.

The shroud 66 is configured to form a (e.g., outer) peripheral boundary of the core flowpath 28 through at least a portion (or an entirety) of the compressor section 30. The shroud 66 may also house and surround the compressor rotor 38. The shroud 66 of FIG. 2, in particular, includes a shroud wall 68 and the bleed passage 60; e.g., a shroud bleed passage.

The shroud wall 68 extends longitudinally along the core flowpath 28. The shroud wall 68 extends depthwise (e.g., radially and/or axially) between and to an interior surface 70 of the shroud 66 and its shroud wall 68 and an exterior surface 72 of the shroud 66 and its shroud wall 68. The shroud wall 68 extends circumferentially about (e.g., completely around) the axial centerline 22, which may thereby provide the shroud 66 and its shroud wall 68 with a tubular body. The interior surface 70 may form a (e.g., outer) peripheral boundary of the core flowpath 28 longitudinally along and, more particularly, within/through at least a portion or an entirety of the shroud 66. The exterior surface 72 may form a (e.g., inner) peripheral boundary of the exterior plenum 62 longitudinally along and, more particularly, outside of at least a portion or the entirety of the shroud 66.

Figure 3:
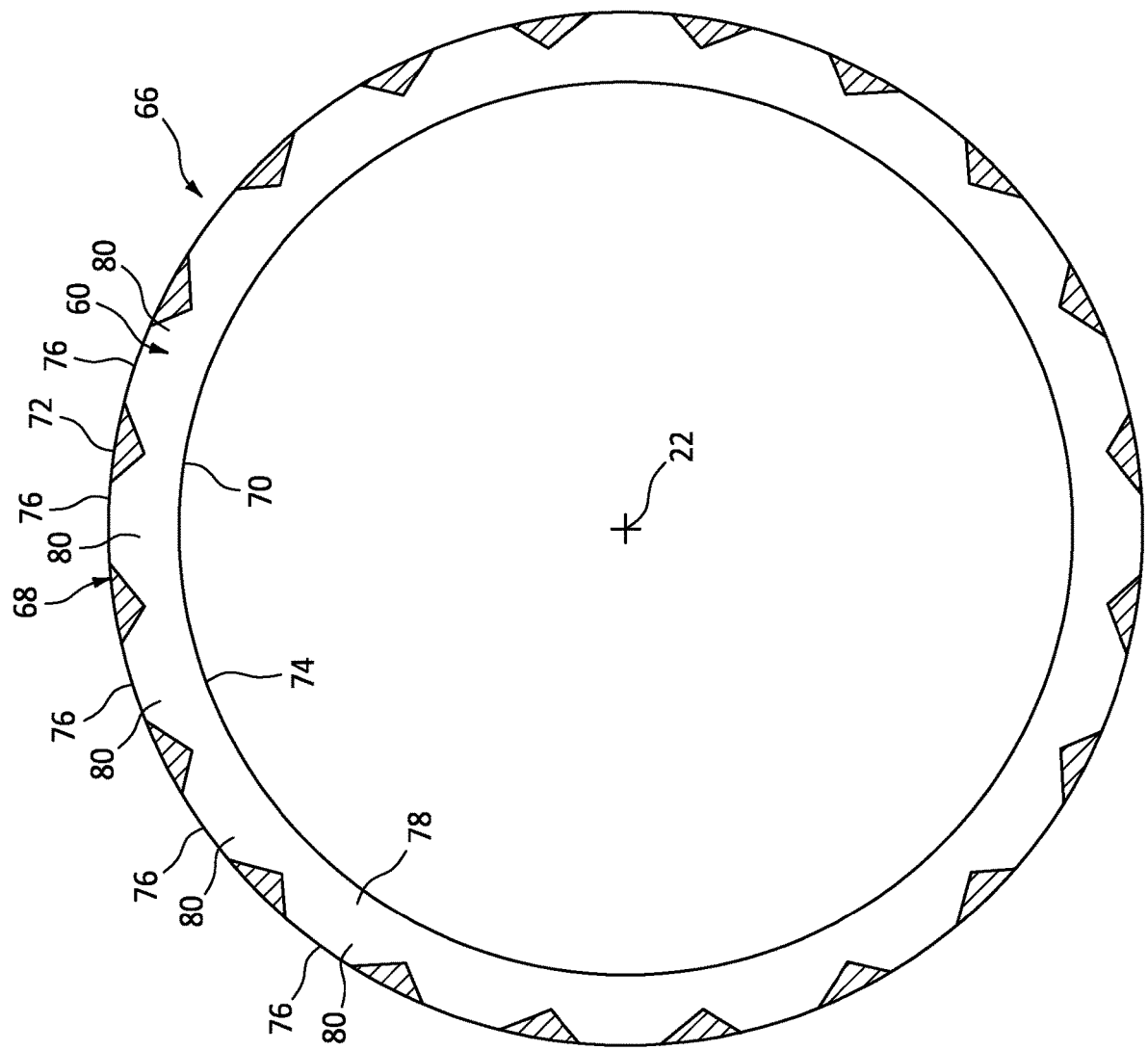
FIG. 3 is a cross-sectional illustration of the shroud at a bleed passage.

Referring to FIG. 3, the bleed passage 60 extends depthwise (e.g., radially in FIG. 3) through the shroud 66 and its shroud wall 68 from an inlet orifice 74 to the bleed passage 60 to one or more outlet orifices 76 from the bleed passage 60 (only some of which are labeled in FIG. 3 for ease of illustration). The inlet orifice 74 is disposed in the interior surface 70. This inlet orifice 74 of FIG. 3 is annular and extends circumferentially around the axial centerline 22 in the interior surface 70. The outlet orifices 76 are disposed in the exterior surface 72. These outlet orifices 76 are arranged circumferentially about the axial centerline 22 in a (e.g., circular) array. The outlet orifices 76, for example, may be longitudinally (e.g., axially in FIG. 3) aligned with one another. The outlet orifices 76 may also be spaced equidistant about the axial centerline 22, where each outlet orifice 76 is circumferentially spaced from its neighboring (e.g., adjacent) outlet orifices 76 by common (e.g., the same) circumferential inter-orifice distances. The outlet orifices 76 may be longitudinally (e.g., axially in FIG. 3) aligned with the inlet orifice 74; see also FIG. 4. With such an arrangement, the bleed passage 60 of FIG. 4 may be perpendicular to the surface 70, 72 at the respective orifice 74, 76. However, in other embodiments, it is contemplated one or more of the outlet orifices 76 may be slightly or completely longitudinally misaligned (e.g., forward or aft) from the inlet orifice 74 such that the bleed passage 60 is angularly offset from the surface 70, 72 at the respective orifice 74, 76.

Figure 4:
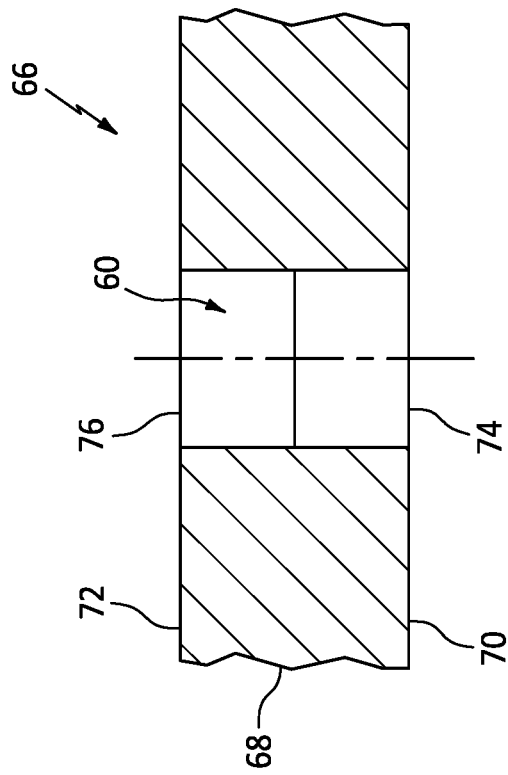
FIG. 4 is a partial side sectional illustration of the shroud at the bleed passage of FIG. 3.

The bleed passage 60 of FIG. 3 includes (e.g., is formed from) an inlet leg 78 and one or more outlet legs 80 fluidly coupled with (e.g., and branching off from) the inlet leg 78. The inlet leg 78 may be formed by an annular channel. The inlet leg 78 of FIG. 3, for example, projects depthwise (e.g., radially in FIG. 3) partially into the shroud 66 and its shroud wall 68 from the inlet orifice 74 towards the exterior surface 72, and to the outlet legs 80. The inlet leg 78 extends circumferentially about (e.g., completely around) the axial centerline 22 within the shroud 66 and its shroud wall 68. Referring to FIG. 4, the inlet leg 78 extends longitudinally (e.g., axially in FIG. 4) within the shroud 66 and its shroud wall 68 between opposing sides 84 of the bleed passage 60. Here, the inlet leg 78 of FIGS. 3 and 4 may completely form the inlet orifice 74 in the interior surface 70.

Figure 5:
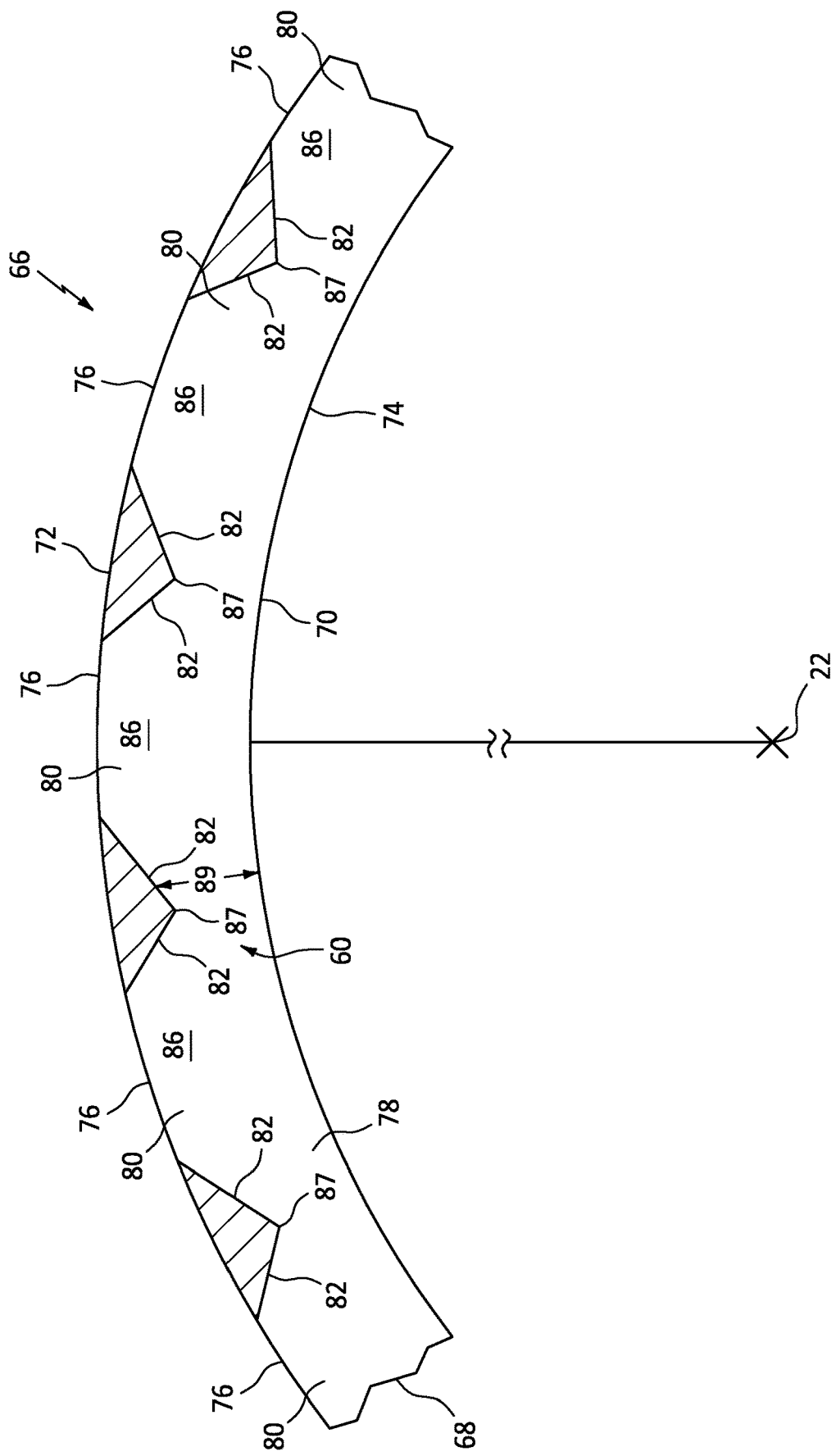
FIG. 5 is an enlarged illustration of a portion of the shroud in FIG. 3.

Referring to FIG. 3, the outlet legs 80 are arranged circumferentially about the axial centerline 22 in an array (e.g., circular array). Referring to FIG. 5, each outlet leg 80 may be formed by an aperture such as a slot. Each outlet leg 80 of FIG. 5, for example, projects depthwise (e.g., radially in FIG. 5) partially into the shroud 66 and its shroud wall 68 from a respective one of the outlet orifices 76 towards the interior surface 70, and to the inlet leg 78. Each outlet leg 80 extends laterally (e.g., circumferentially in FIG. 5) between opposing sides 82 of that respective outlet leg 80. Referring to FIG. 4, each outlet leg 80 extends longitudinally (e.g., axially in FIG. 4) within the shroud 66 and its shroud wall 68 between the bleed passage sides 84. Here, each outlet leg 80 of FIGS. 4 and 5 may completely form its respective outlet orifice 76 in the exterior surface 72.

Referring to FIG. 5, each outlet leg 80 may laterally (e.g., circumferentially in FIG. 5) taper as that outlet leg 80 extends in a depthwise outward direction. Each outlet leg 80 of FIG. 5, for example, laterally tapers as that outlet leg 80 extends depthwise from the inlet leg 78 to the respective outlet orifice 76. More particularly, the outer leg sides 82 may laterally converge towards one another as the respective outlet leg 80 extends within the shroud 66 and its shroud wall 68 towards (e.g., to) the respective outlet orifice 76. The outlet leg sides 82 of FIG. 5, for example, are angularly offset from one another by an included angle (e.g., an acute angle, a right angle or an obtuse angle) when viewed, for example, in a reference plane perpendicular to the axial centerline 22. With such an arrangement, each outlet leg 80 provides a corresponding (e.g., downstream) section 86 of the bleed passage 60 with a tapered geometry. Each bleed passage section 86 of FIG. 5, in particular, laterally tapers as that bleed passage section 86 extends within the shroud wall 68 towards (e.g., to) the respective outlet orifice 76. In addition, the bleed passage 60 may radially taper as the bleed passage 60 extends circumferentially along each outer leg side 82 from the respective outlet orifice 76 in the exterior surface 72 to a peak 87 between that outer leg side 82 and another (circumferentially adjacent) outer leg side 82. In other words, a radial distance 89 from the inlet orifice 74 in the interior surface 70 to each outer leg side 82 increases as that outer leg side 82 extends from its respective peak 87 to the respective outlet orifice 76 in the exterior surface 72. Dimensions/area of the bleed passage 60 may thereby vary as the bleed passage extends radially and/or circumferentially within the shroud wall 68.

Figure 6:
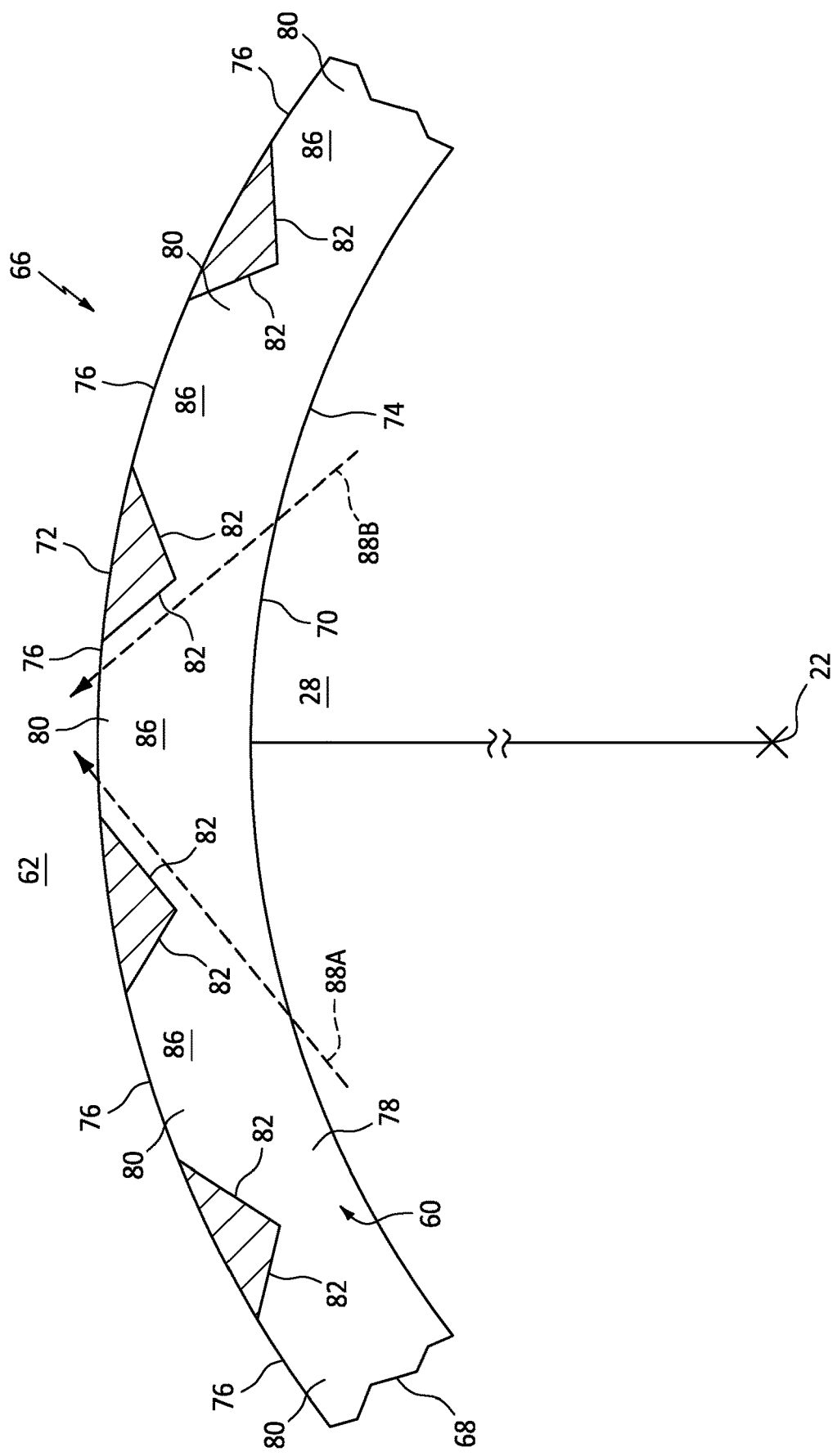
FIG. 6 is another enlarged illustration of a portion of the shroud in FIG. 3 with flow trajectories.

During operation, referring to FIG. 6, the core air bled from the core flowpath 28 into the bleed passage 60 through the inlet orifice 74 may travel along various trajectories. These trajectories may include a trajectory 88A with a first circumferential component (e.g., a clockwise component) and/or a trajectory 88B with a second circumferential component (e.g., a counterclockwise component). By providing the bleed passage 60 with the one or more tapered bleed passage sections 86, the bled core air may more efficiently (e.g., with less resistance) pass through the bleed passage 60 from the core flowpath 28 to the plenum. The bleed passage configuration of the present disclosure may thereby improve bleed air flow and facilitate an increased magnitude of bleed air flow through the bleed passage 60 as compared to a bleed passage with a non-tapered and/or purely radially extending configuration. The bleed passage configuration of the present disclosure may provide a balance between bleed air flowrate and bleed air pressure at the bleed passage 60 without, for example, a degradation in performance. The bleed passage configuration of the present disclosure may also affect vortices to reduce a pressure differential across the bleed passage 60.

Figure 8:
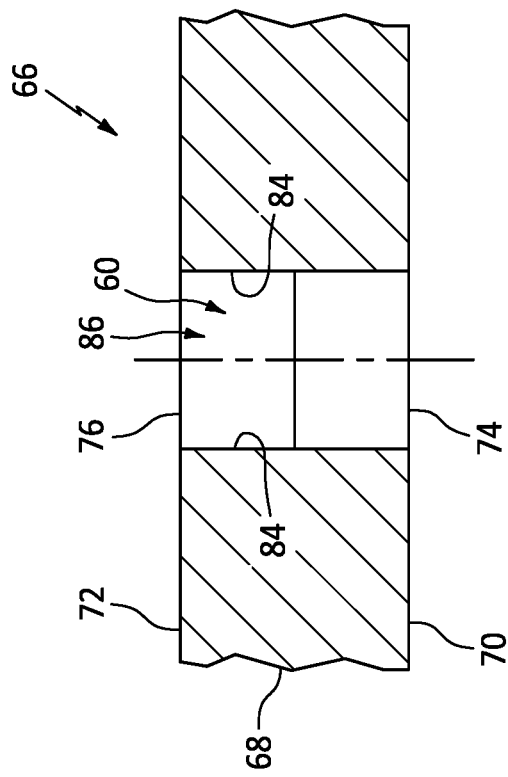
FIG. 8 is a partial side sectional illustration of the shroud at the bleed passage of FIG. 7.

While the bleed passage 60 may include one or more tapered (e.g., downstream) bleed passage sections at and/or to the outlet orifices 76, the bleed passage 60 may also (or alternatively) include one or more tapered (e.g., upstream) bleed passage sections at and/or to one or more inlet orifices 74. The bleed passage 60 of FIG. 7, for example, includes multiple of the inlet orifices 74 (only some of which are labeled in FIG. 7 for ease of illustration) in the interior surface 70. The inlet orifices 74 may be arranged circumferentially about the axial centerline 22 in a (e.g., circular) array. The inlet orifices 74, for example, may be longitudinally (e.g., axially in FIG. 7) aligned with one another. The inlet orifices 74 may also be spaced equidistant about the axial centerline 22, where each inlet orifice 74 is circumferentially spaced from its neighboring (e.g., adjacent) inlet orifices 74 by common (e.g., the same) circumferential inter-orifice distances. The inlet orifices 74 may be longitudinally (e.g., axially in FIG. 7) aligned with the outlet orifices 76; see also FIG. 8. With such an arrangement, the bleed passage 60 of FIG. 8 may be perpendicular to the surface 70, 72 at the respective orifice 74, 76. However, in other embodiments, it is contemplated one or more of the inlet orifices 74 may be slightly or completely longitudinally misaligned from one or more of the outlet orifices 76 such that the bleed passage 60 is angularly offset from the surface 70, 72 at the respective orifice 74, 76.

Figure 7:
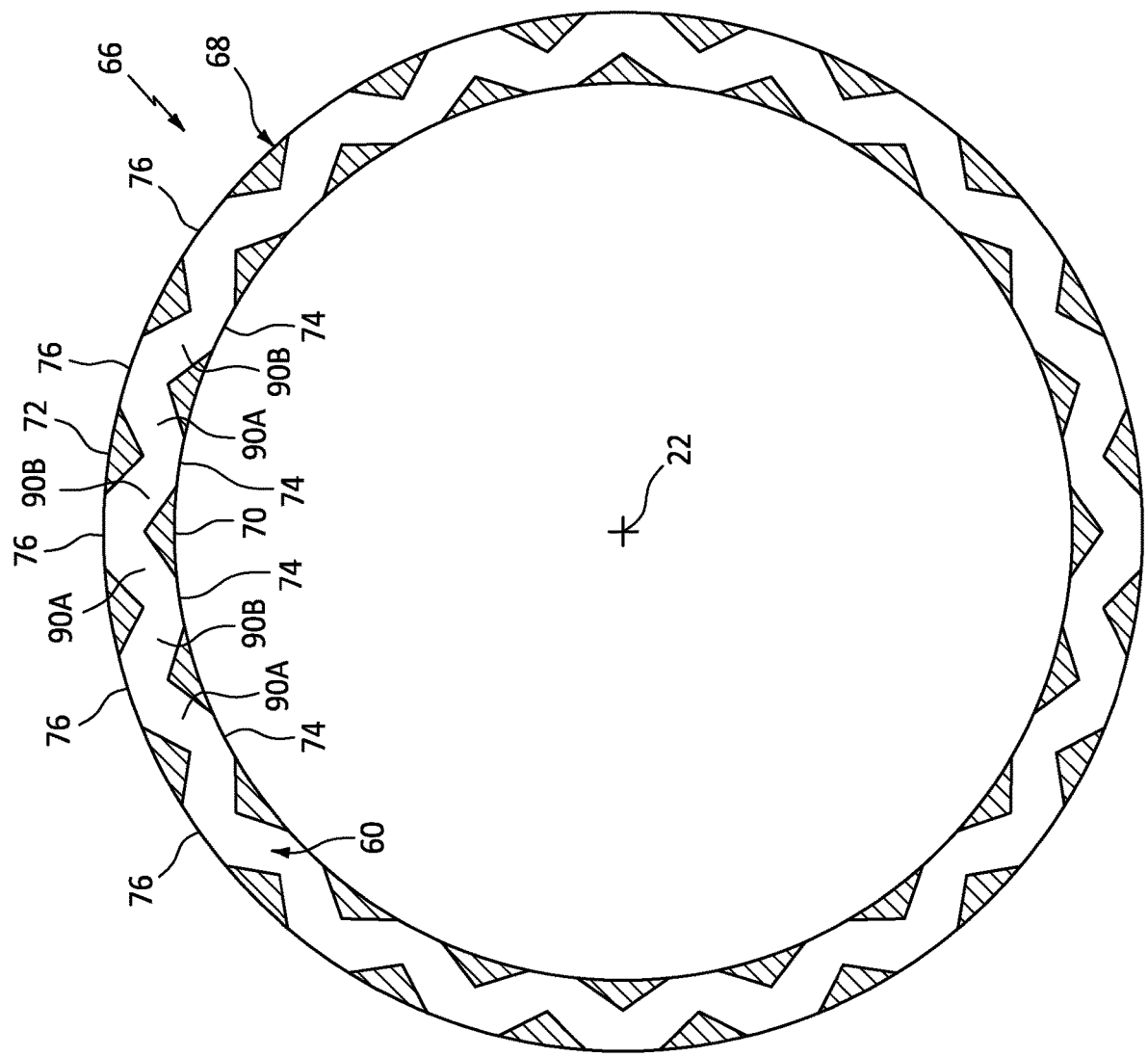
FIG. 7 is a cross-sectional illustration of the shroud at the bleed passage with another arrangement of inlet and outlet orifices.
Figure 9:
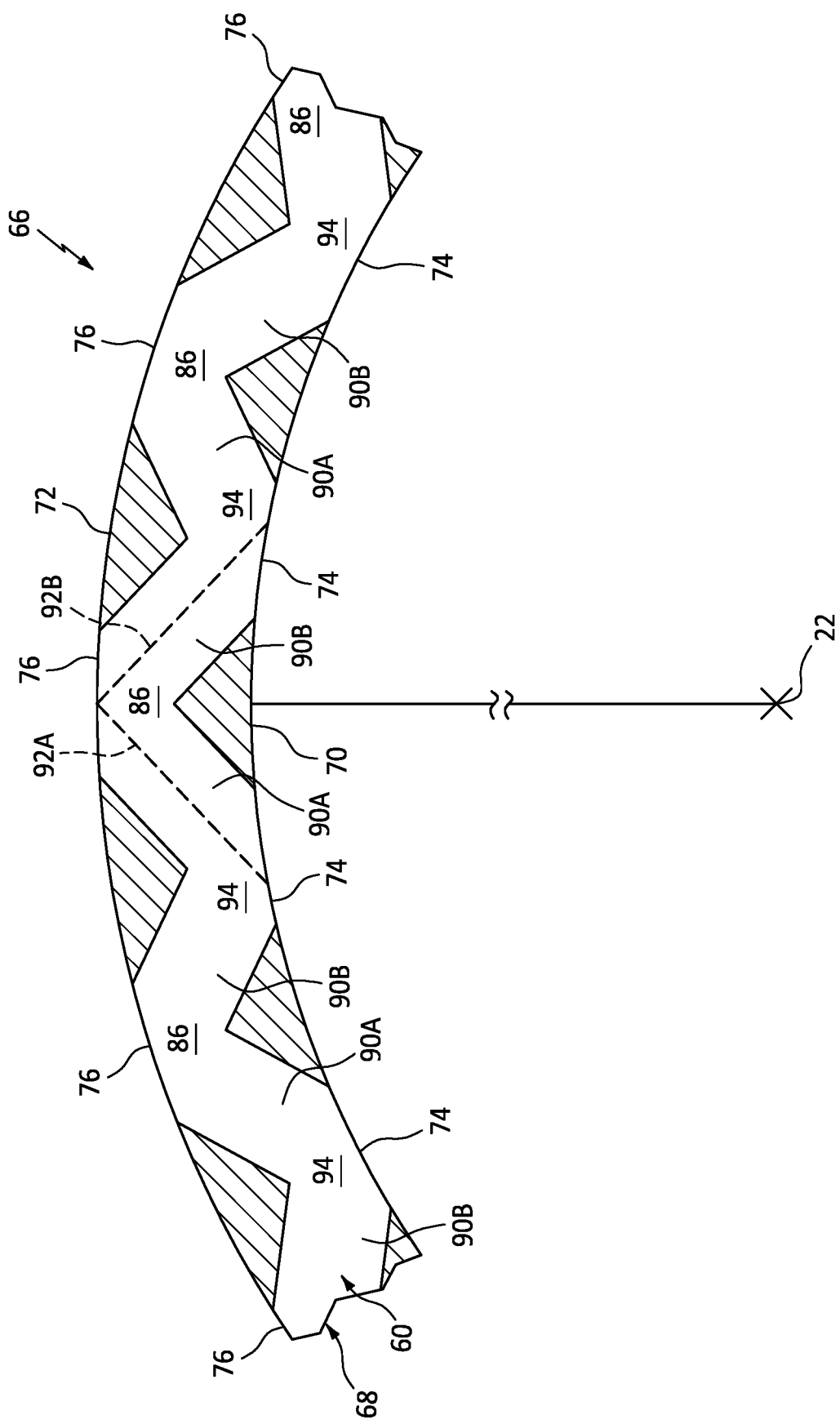
FIG. 9 is an enlarged illustration of a portion of the shroud in FIG. 7.

The bleed passage 60 of FIG. 7 includes (e.g., is formed from) one or more first passage legs 90A and one or more second passage legs 90B (only some of which passage legs are labeled for ease of illustration). The first passage legs 90A may be interspersed with the second passage legs 90B, and the passage legs 90A and 90B (generally referred to as "90") may collectively be arranged circumferentially about the axial centerline 22 in a (e.g., circular) array. Referring to FIG. 9, each first passage leg 90A extends depthwise (e.g., radially in FIG. 9) along a (e.g., straight) centerline 92A of that first passage leg 90A through the shroud 66 and its shroud wall 68 from a respective one of the inlet orifices 74 to a respective one of the outlet orifices 76. The first leg centerline 92A of FIG. 9 has a lateral (e.g., circumferential in FIG. 9) component in a first direction (e.g., clockwise about the axial centerline 22). Each second passage leg 90B extends depthwise (e.g., radially in FIG. 9) along a (e.g., straight) centerline 92B of that second passage leg 90B through the shroud 66 and its shroud wall 68 from a respective one of the inlet orifices 74 to a respective one of the outlet orifices 76. The second leg centerline 92B of FIG. 9 has a lateral (e.g., circumferential in FIG. 9) component in a second direction (e.g., counterclockwise about the axial centerline 22). The second leg centerline 92B is thereby angularly offset from the first leg centerline 92A by an included angle (e.g., an acute angle, a right angle or an obtuse angle) when viewed, for example, in a reference plane perpendicular to the axial centerline 22.

With the foregoing arrangement, a neighboring pair of the passage legs 90A and 90B may laterally converge and meet at/collectively form a respective one of the inlet orifices 74. Each converging pair of the passage legs 90A and 90B may provide a corresponding (e.g., upstream) section 94 of the bleed passage 60 with a tapered geometry. Each bleed passage section 94 of FIG. 9, in particular, laterally tapers as that bleed passage section 94 extends within the shroud wall 68 towards (e.g., to) the respective inlet orifice 74. Similarly, a different neighboring pair of the passage legs 90A and 90B may laterally converge and meet at/collectively form a respective one of the outlet orifices 76. Each converging pair of the passage legs 90A and 90B may provide a corresponding (e.g., downstream) section 86 of the bleed passage 60 with a tapered geometry. Each bleed passage section 86 of FIG. 9, in particular, laterally tapers as that bleed passage section 86 extends within the shroud wall 68 towards (e.g., to) the respective outlet orifice 76.

The bleed passage 60 is described above as a passage fluidly coupling the core flowpath 28 to the exterior plenum 62. It is contemplated, however, the bleed passage 60 may alternative be configured to fluidly couple the core flowpath 28 (or another flowpath within the gas turbine engine 20) to another volume (e.g., a plenum, a passage, etc.) within the gas turbine engine 20, or another volume within another component outside of the gas turbine engine 20. Furthermore, it is contemplated the bleed passage 60 may be located at various other locations along the core flowpath 28 (or another flowpath) within the gas turbine engine 20.

The gas turbine engine 20 is described above as a single spool, radial-flow gas turbine engine for ease of description. The present disclosure, however, is not limited to such an exemplary gas turbine engine. The gas turbine engine 20, for example, may alternatively be configured as an axial flow gas turbine engine. The gas turbine engine 20 may be configured as a direct drive gas turbine engine. The gas turbine engine 20 may alternatively include a gear train that connects one or more rotors together such that the rotors rotate at different speeds. The gas turbine engine 20 may be configured with a single spool (e.g., see FIG. 1), two spools, or with more than two spools. In addition, while the gas turbine engine 20 is described above with an exemplary reverse flow annular combustor, the gas turbine engine 20 may also or alternatively include any other type/configuration of annular, tubular (e.g., CAN), axial flow and/or reverse flow combustor. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a gas turbine engine, comprising:
a shroud including a wall and a bleed passage;
the wall including an interior surface and an exterior surface, the wall extending circumferentially about an axis, the wall extending depthwise between the interior surface and the exterior surface, and the interior surface forming a peripheral boundary of a flowpath that extends longitudinally along the shroud; and
the bleed passage including an inlet orifice and an outlet orifice, the bleed passage extending through the shroud between the inlet orifice and the outlet orifice, the inlet orifice disposed in the interior surface and fluidly coupling the flowpath to the bleed passage, and at least a downstream section of the bleed passage circumferentially tapering as the downstream section of the bleed passage extends within the wall towards the outlet orifice;
wherein the inlet orifice is annular and extends circumferentially completely about the axis in the interior surface; and
a compressor rotor housed within the shroud, the compressor rotor comprising a plurality of blades arranged circumferentially about the axis and disposed within the flowpath, wherein the inlet orifice is adjacent the compressor rotor and longitudinally and circumferentially overlaps the plurality of blades.

2. The apparatus of claim 1, wherein
the bleed passage further includes a second outlet orifice; and
a second downstream section of the bleed passage circumferentially tapers as the second downstream section of the bleed passage extends within the wall towards the second outlet orifice.

3. The apparatus of claim 2, wherein at least one of
the second outlet orifice is circumferentially offset from the outlet orifice about the axis; or
the second outlet orifice is axially aligned with the outlet orifice along the axis.

4. The apparatus of claim 1, wherein the outlet orifice is non-annular.

5. The apparatus of claim 1, wherein
the outlet orifice is one of a plurality of outlet orifices;
the bleed passage further includes an inlet leg and a plurality of outlet legs fluidly coupled with and branching off from the inlet leg;
the inlet leg forms the inlet orifice; and
each of the plurality of outlet legs forms a respective one of the plurality of outlet orifices.

6. The apparatus of claim 5, wherein a first of the plurality of outlet legs circumferentially tapers within the wall as the first of the plurality of outlet legs extends towards a first of the plurality of outlet orifices.

7. The apparatus of claim 1, wherein the bleed passage further includes
a second outlet orifice;
a first passage leg extending through the shroud from the inlet orifice to the outlet orifice; and
a second passage leg extending through the shroud from the inlet orifice to the second outlet orifice.

8. The apparatus of claim 7, wherein a centerline of the first passage leg is angularly offset from a centerline of the second passage leg by an included angle.

9. The apparatus of claim 1, wherein at least one of
the outlet orifice is disposed in the exterior surface; or
the exterior surface forms a peripheral boundary of a plenum along the shroud, and the outlet orifice fluidly couples the bleed passage to the plenum.

10. An apparatus for a gas turbine engine, comprising:
a shroud including a wall and a bleed passage;
the wall including an interior surface and an exterior surface, the wall extending circumferentially about an axis, the wall extending radially between the interior surface and the exterior surface, and the interior surface forming an outer peripheral boundary of a flowpath that extends within the shroud;
the bleed passage including an inlet orifice, a plurality of outlet orifices, an inlet leg and a plurality of outlet legs fluidly coupled with and branching off from the inlet leg, the inlet orifice disposed in the interior surface and fluidly coupling the flowpath to the bleed passage, the inlet leg extending radially within the shroud to the inlet orifice, each of the plurality of outlet legs extending radially within the shroud to a respective one of the plurality of outlet orifices; and a first of the plurality of outlet legs circumferentially tapering as the first of the plurality of outlet legs extends radially within the shroud to the respective one of the plurality of outlet orifices; and
a compressor impeller housed within the shroud, the inlet orifice located along the interior surface downstream of leading edges of vanes of the compressor impeller.

11. The apparatus of claim 10, wherein the inlet orifice and the inlet leg are annular.

12. An apparatus for a gas turbine engine, comprising:
a shroud including a wall and a bleed passage;
the wall including an interior surface and an exterior surface, the wall extending circumferentially about an axis, the wall extending depthwise between the interior surface and the exterior surface, and the interior surface forming a peripheral boundary of a flowpath that extends along the shroud; and
the bleed passage including an inlet orifice and an outlet orifice, the bleed passage extending through the shroud between the inlet orifice and the outlet orifice, the inlet orifice disposed in the interior surface and fluidly coupling the flowpath to the bleed passage, and at least a downstream section of the bleed passage circumferentially tapering as the downstream section of the bleed passage extends within the wall towards the outlet orifice;
wherein the inlet orifice extends circumferentially about the axis in the interior surface;
wherein the inlet orifice extends axially along the axis in the interior surface from an upstream side of the inlet orifice defined by the interior surface to a downstream side of the inlet orifice defined by the interior surface; and
wherein the inlet orifice extends completely around the axis in the interior surface; and
a compressor rotor housed within the shroud, the inlet orifice formed in the interior surface longitudinally along the compressor rotor.

13. The apparatus of claim 12, wherein
the bleed passage further includes a second outlet orifice; and
a second downstream section of the bleed passage circumferentially tapers as the second downstream section of the bleed passage extends within the wall towards the second outlet orifice.

* * * * *